United States Patent
Sausner

[11] Patent Number: 6,164,704
[45] Date of Patent: Dec. 26, 2000

[54] HOSE FITTING

[75] Inventor: Andreas Sausner, Frankfurt, Germany

[73] Assignee: ITT Manufacturing Enterprises, Inc., Wilmington, Del.

[21] Appl. No.: 09/233,975

[22] Filed: Jan. 20, 1999

[30] Foreign Application Priority Data

Jan. 21, 1998 [DE] Germany ............ 198 02 039

[51] Int. Cl.[7] .................................................. F16L 25/02
[52] U.S. Cl. ................ 285/55; 285/256; 285/222.1; 285/259; 285/54
[58] Field of Search ................ 285/256, 259, 285/222.1, 55, 54

[56] References Cited

U.S. PATENT DOCUMENTS

| 3,462,177 | 8/1969 | Skinner et al. | 285/222.1 |
|---|---|---|---|
| 3,549,180 | 12/1970 | MacWilliam | 285/256 |
| 3,875,970 | 4/1975 | Fitter . | |
| 4,279,435 | 7/1981 | Alewitz | 285/242 |
| 4,611,832 | 9/1986 | Matsuoka et al. | 285/256 |
| 4,664,424 | 5/1987 | Smith | 285/256 |
| 5,430,603 | 7/1995 | Albino et al. | 138/125 |
| 5,474,109 | 12/1995 | Stoeppelmann et al. . | |
| 5,553,896 | 9/1996 | Woodward | 285/256 |
| 5,622,394 | 4/1997 | Soles et al. . | |

FOREIGN PATENT DOCUMENTS

| 0 655 377 | 5/1995 | European Pat. Off. . |
|---|---|---|
| 2 715 452 A1 | 1/1994 | France . |
| 2 715 452 | 7/1995 | France . |
| 2 738 893 | 3/1997 | France . |
| 35 13 267 | 4/1985 | Germany . |
| 35 14 315 | 4/1985 | Germany . |
| 43 02 628 | 1/1993 | Germany . |
| 43 02 628 A 1 | 8/1994 | Germany . |

*Primary Examiner*—Eric K. Nicholson
*Attorney, Agent, or Firm*—Robert P. Seitter

[57] ABSTRACT

The invention relates to a hose fitting, more specifically, for a brake arrangement in a motor vehicle, for connecting, in a compression-proof manner, a multi-layer hose to a metallic end piece. At least part of one free end of the end piece engages with the inside of the hose and features at least one bulge, with a metallic pressed sleeve encompassing the hose, overlapping the bulge and also featuring, lateral to the bulge, respective first pressed sections. The crux of the invention is based on the fact that elastic and electrically nonconducting surface layers are arranged on the hose and end piece, upon which are arranged, in each case, a second pressed section in a liquid-tight manner. The invention is associated with the advantage that a hose fitting is sealed with respect to electrolyte penetration from the outside, and that, moreover, local cell formation, with resultant corrosion of the hose fitting, is prevented.

12 Claims, 1 Drawing Sheet

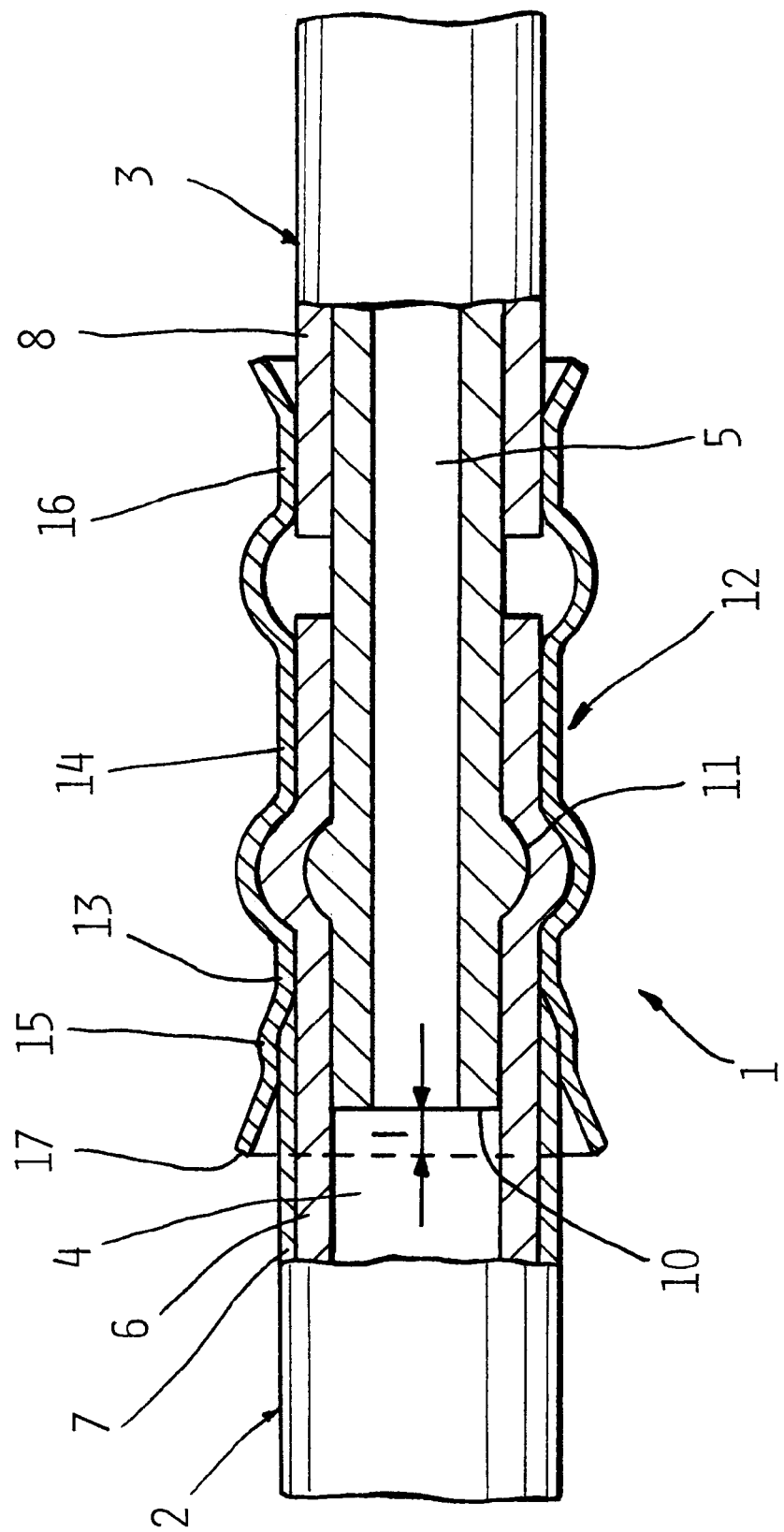

HOSE FITTING

BACKGROUND OF THE INVENTION

The invention relates to a hose fitting, more specifically, for a brake arrangement in a motor vehicle, for connecting, in a compression-proof manner, a multi-layer hose to a metallic end piece, tube, or the like, of which at least part of one end engages with the inside of the hose and features at least one bulge; with a metallic pressed sleeve, which encompasses the hose, such that the pressed sleeve overlaps said bulge and having, lateral to said bulge, respective first pressed sections.

In accordance with an internal state of the art of the applicant, an end piece is provided with a second bulge which, within the scope of production and of pressing a hose fitting, serves as a limit stop for one end of the pressed sleeve. As a result, the end of a pressed sleeve may be placed against said second bulge. This allows a pressed sleeve to be positioned in an unequivocal manner, but external liquid and, consequently, electrolytes, may penetrate through gaps which are present, into the space between the pressed sleeve and end piece, leading as far as to a case where a passivation layer of an end piece is dissolved as a result of local cell formation. In relation to this, it must be taken into consideration that a pressed sleeve usually consists of a chrome nickel steel, while an end piece is constructed of a metallic material, such as steel or iron, provided with a passivation layer. This means the danger exists that the passivation layer of a material will separate. Consequently, corrosion of a hose fitting may not be ruled out through an attack of an external electrolyte, which may even be contained in ambient air.

SUMMARY OF THE INVENTION

The purpose of the present invention is to provide an economical, compression-proof hose fitting which is resistant to the attack of corrosion, more specifically, as a result of electrolyte entering from the outside and, moreover, is unaffected by high-pressure, in a long-term manner, even by complex stress as a result of pressure pulsation, as well as by external mechanical stress. Moreover, a simple production method shall be indicated.

Said problem will be solved by means of the fact that elastic and electrically nonconducting surface layers are arranged in a hose and end piece, upon each of which is arranged, in a liquid-tight manner, a second pressed section. Elastic surface layers lead, so to speak, to a seal of a hose fitting in the vulnerable region. Also, this virtually provides electrical insulation, such that local cell formation is ruled out.

In addition, it has been found, surprisingly, that for a hose fitting of this type, having a first and second pressed section, even one single bulge on an end piece is sufficient for providing a permanent and compression-proof connection.

DESCRIPTION OF THE PREFERRED EMBODIMENT

The invention is explained in detail in the following, with the aid of the embodiment example of the FIGURE. A hose fitting (1), serves for a compression-proof connection of a multi-layer hose (2) to an end piece (3), tube or the like, such that a compressed agent may be transported through the interior of the hose (4) and the interior of the tube (5). The hose (2) has a radial inner layer (6) having at least one reinforcing insert, more specifically, a braided sleeving of PTFE (polytetrafluoroethylene) and also, additionally or alternately, a braided sleeving of chrome nickel steel. A plastic surface layer (7) is provided on the outside, in a radial sense.

As the FIGURE shows, the free end (10) of an end piece (3) engages with the inside of a hose (4) and features a bulge (11) which, in connection with a pressed sleeve (12) serves for a mechanical fastening. The pressed sleeve (12) overlaps the bulged region and encompasses the hose (2) with, lateral to the bulge (11), one first pressed section (13,14), respectively, being seated closely next to the outside of a radial inner layer (6) of the hose (2). Thus, the surface layer (7) is removed in the region of the first pressed sections (13,14). Moreover, a pressed sleeve (12) features two yet additional pressed sections (15,16) displaced, in each case, outward in an axial sense; a first pressed section (15) is arranged, in a flexible way, on the elastic and electrically nonconducting surface layer (7) of the hose (2). On the axial outer end (17) of the hose side of a pressed sleeve (12), a section of the casing extends in a manner virtually angular to an imaginary axis which extends through hose (2) and end piece (3).

On the side of the end piece, a second pressed section (16) is arranged closely on an elastic and electrically nonconducting surface layer (8) of the end piece (3); the casing at the end of this pressed sleeve (12) also projects at an angle to the imaginary axis.

With respect to the thickness of material and layers, the following combinations come into particular consideration. It is preferable for a surface layer (8) of an end piece (3) to consist of polyamide and to possess a layer thickness of between 25 to 250 $\mu$m. In a different, advantageous embodiment of the invention, the surface layer (8) of an end piece (3) consists of polyvinyl fluoride or polyvinylidene fluoride and it has been proven that a layer thickness of 5 to 150 $\mu$m fulfills the demands and solves the problems in question.

In accordance with the invention, a hose fitting is sealed with respect to electrolyte penetration from the outside to the inside and this is guaranteed, based on the increased resistance to corrosion and improved fatigue strength. Moreover, this hose fitting is suitable for lowering production expense and, consequently, production cost, since even one single bulge (11) is sufficient to ensure a resistance to high-pressure. More specifically, no bulge is necessary in order to position a pressed sleeve (12) in relation to an end piece (3), or to place the former against the latter. Within the scope of production of a hose fitting in accordance with the invention, an end piece (3), which is pushed into a hose (2), together with a pressed sleeve (12), is inserted in a tool in such a way that a limit stop, fixed to the tool, provides for a correct positioning of the pressed sleeve (12) relative to the end piece (3) and hose (2). Accordingly, an advantageous method is present for producing a hose fitting (1).

In relation to this, reference is made to the fact that the end (17) of a pressed sleeve (12) on the hose side always must be aligned such that a length (1) overlaps, in an axial sense, a free end (10) of the end piece (3). This leads to an increased insensitivity of a hose fitting to buckling and bending. In addition, temporary expansion of a hose (2) created by pressure pulsation is absorbed by a region of a pressed sleeve (12) that projects at an angle, without the occurrence of damage to the elastic material of the hose.

It bears emphasizing that multiple advantageous modifications of the invention may be conceived without departing from the idea of the invention.

What is claimed:

1. A hose fitting for connecting a multi-layer hose to a metallic end piece in a compression-proof manner:

the multi-layer hose having:
  a) an elastic and electrically non-conductive layer having an outer surface; and
  b) at least one underlying layer having characteristics of higher electrical conductivity than the elastic and electrically non-conductive layer, the underlying layer of the multi-layer hose having an inner surface extending beyond the elastic and electrically non-conductive layer;

the metallic end piece having:
  a) an elastic and electrically non-conductive layer;
  b) at least one underlying layer having conductive characteristics greater than those exhibited by the non-conductive layer of the end piece; and
  c) an end region characterized by an outward projection of the underlying layer beyond the non-conductive layer, the outward projection having an outwardly oriented surface and at least one bulge extending outward therefrom, at least a portion of the end region and associated bulge engageable with the inner surface of the hose;

the hose fitting comprising:
  a metallic sleeve which encompasses the hose such that the metallic sleeve overlaps the bulge, the metallic sleeve having first and second pressed sections positioned so as to contact and maintain associated regions of the outward projection of the hose in sandwiched relationship between the metallic sleeve and the outward projection of the end piece, the first and second pressed sections located lateral to the bulge and having inner diameters essentially equivalent to one another.

2. The hose fitting of claim 1, characterized in that the end piece features a polyamide surface layer.

3. The hose fitting of claim 2, characterized in that the surface layer of the end piece features a thickness of 25 to 250 µm.

4. The hose fitting of claim 1, characterized in that the surface layer of the end piece consists of a one of polyvinyl fluoride and polyvinylidene fluoride.

5. The hose fitting of claim 4, characterized in that a surface layer features a thickness of 5 to 150 µm.

6. The hose fitting of claim 5, characterized in that the hose features a radial inner layer having at least one reinforcing insert and one radial outer surface layer.

7. The hose fitting of claim 6, characterized in that a surface layer is not provided in the region of the first pressed sections.

8. The hose fitting of claim 1 wherein the metallic sleeve further comprises:
  opposed third and fourth pressed sections positioned in contact with the associated elastic and electrically non-conducting surface layers of the hose and end piece respectively;
  the opposed third and fourth pressed sections in distal relationship to the respective first and second pressed sections such that the third pressed section sandwichingly contacts the elastic and electrically non-conducting surface layer of the hose and associated underlying layer of the hose between itself and the outward projection of the end piece, and, the fourth pressed section sandwichingly contacts the elastic and electrically non-conducting surface of the metallic end piece in sandwiched relationship between the underlying layer and the inner surface of the metallic sleeve.

9. The hose fitting of claim 8 wherein the diameter of the third pressed section of the metallic sleeve is greater than the diameter of the fourth pressed section and is essentially equal to the diameters of the first and second pressed sections.

10. The hose fitting of claim 1 wherein the metallic sleeve further comprises:
  an annular bulge positioned between and contiguous to the first and second pressed sections.

11. The hose fitting of claim 10 wherein the annular bulge has an inner contour adapted to receive the associated bulge of the end region such that the underlying layer of the hose is interposed therebetween.

12. The hose fitting of claim 10 wherein the metallic sleeve further comprises:
  a second annular bulge interposed between and contiguous to the second and fourth pressed sections.

* * * * *